(12) United States Patent
Gorin et al.

(10) Patent No.: US 7,957,971 B2
(45) Date of Patent: *Jun. 7, 2011

(54) SYSTEM AND METHOD OF SPOKEN LANGUAGE UNDERSTANDING USING WORD CONFUSION NETWORKS

(75) Inventors: Allen Louis Gorin, Berkeley Heights, NJ (US); Dilek Z. Hakkani-Tur, Parsippany, NJ (US); Giuseppe Riccardi, Hoboken, NJ (US); Gokhan Tur, Parsippany, NJ (US); Jeremy Huntley Wright, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/483,853

(22) Filed: Jun. 12, 2009

(65) Prior Publication Data

US 2009/0248416 A1 Oct. 1, 2009

Related U.S. Application Data

(63) Continuation of application No. 10/448,149, filed on May 29, 2003, now Pat. No. 7,571,098.

(51) Int. Cl.
*G10L 15/18* (2006.01)
*G10L 15/00* (2006.01)
*G10L 15/06* (2006.01)
*G10L 15/28* (2006.01)
*G06F 17/27* (2006.01)

(52) U.S. Cl. ............ 704/257; 704/9; 704/236; 704/243; 704/255

(58) Field of Classification Search ........................ None
See application file for complete search history.

(56) References Cited

U.S. PATENT DOCUMENTS

| 5,450,598 | A | 9/1995 | Kaplan et al. |
| 6,032,111 | A | 2/2000 | Mohri |
| 6,397,179 | B2 | 5/2002 | Crespo et al. |
| 6,944,588 | B2 | 9/2005 | Kempe |
| 7,092,883 | B1 | 8/2006 | Gretter et al. |
| 7,149,687 | B1 | 12/2006 | Gorin et al. |
| 2001/0041978 | A1 | 11/2001 | Crespo et al. |

OTHER PUBLICATIONS

Gorin, A.L. et al., "Automated Natural Spoken Dialog," IEEE Computer Magazine, vol. 35, No. 4, pp. 51-56, Apr. 2002.
Gorin, A.L. et al., "How May I Help You?," Speech Communication, 1997.
Mangu L. et al., "Finding Consensus in Speech Recognition: Word Error Minimization and Other Applications of Confusion Networks," Computer Speech and Language, vol. 14, No. 4, pp. 373-400, 2000.
Gorin, A.L. et al., "Semantic Information Processing of Spoken Language", in Proceedings of the ATR Workshop on Multi-Lingual Speech Communication, Kyoto, Japan, Oct. 2000, pp. 13-16.
Wright, J. et al., "Automatic Acquisition of Salient Grammar Fragments for Call-Type Classification," in Proceedings of the Eurospeech, Rhodes, Greece, Sep. 1997, pp. 1419-1422. Tur, G. et al., "Improving Spoken Language Understanding Using Word Confusion Networks," in Proceedings of ICSLP-2002, the 7th International Conference on Spoken Language Processing, Denver, CO, Sep. 2002.
Tur, G., "Exploiting the FSM and LLAMA Libraries for Spoken Language Understanding," Oct. 2002.

*Primary Examiner* — Brian L Albertalli (57) ABSTRACT

Word lattices that are generated by an automatic speech recognition system are used to generate a modified word lattice that is usable by a spoken language understanding module. In one embodiment, the spoken language understanding module determines a set of salient phrases by calculating an intersection of the modified word lattice, which is optionally preprocessed, and a finite state machine that includes a plurality of salient grammar fragments.

21 Claims, 7 Drawing Sheets

SYSTEM AND METHOD OF SPOKEN LANGUAGE UNDERSTANDING USING WORD CONFUSION NETWORKS

PRIORITY

This application is a continuation of U.S. patent application Ser. No. 10/448,149, filed on May 29, 2003, the contents of which is incorporated herein by reference in its entirety.

BACKGROUND OF THE INVENTION

1. Field of the Invention

The present invention relates generally to spoken language understanding systems and more particularly to improving spoken language understanding systems using word confusion networks.

2. Introduction

Voice-based natural dialog systems enable customers to express what they want in spoken natural language. Such systems automatically extract the meaning from speech input and act upon what people actually say, in contrast to what one would like them to say, thereby shifting the burden from users to the machine.

In a natural language spoken dialog system, it is very important for the system to be robust to automatic speech recognition (ASR) errors, since all the communication is in natural spoken language. Especially with telephone speech, the typical word error rate (WER) is around 30%. To illustrate the potential impact of ASR errors, consider the example of a 1-best ASR output where the ASR system outputs a single best hypothesis. In this example, the 1-best ASR output could include the single best hypothesis, "I have a question about my will." This hypothesis erroneously selected the word "will" instead of "bill". Obviously, a failure to recognize such a salient word would result in misunderstanding the whole utterance, notwithstanding the fact that all the other words have been correctly interpreted. Moreover, it is important that the spoken language understanding system tolerate some amount of orthographic variability, since people say the same thing in different ways.

SUMMARY

Word lattices that are generated by an automatic speech recognition system are used to generate a modified word lattice that is usable by a spoken language understanding module. This modified word lattice can represent a computationally efficient form of the original word lattice. In one aspect of the invention, the spoken language understanding module determines a set of salient phrases by calculating an intersection of the modified word lattice, which is optionally preprocessed, and a finite state machine that includes a plurality of salient grammar fragments.

In one aspect of the present invention, the modified word lattice is based on an alignment of words. The alignment of words serves to produce a more compact representation that can be more easily stored and processed. In a second aspect of the present invention, the modified word lattice is based on a word confusion network.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Various challenges exist in the design and implementation of a natural language spoken dialog system that can efficiently and accurately interpret user utterances. One challenge occurs due to the simple fact that different users can say the same thing in very different ways. For this reason, it is very important that the system be tolerant to recognition errors and some amount of orthographic variability.

Figure 1:
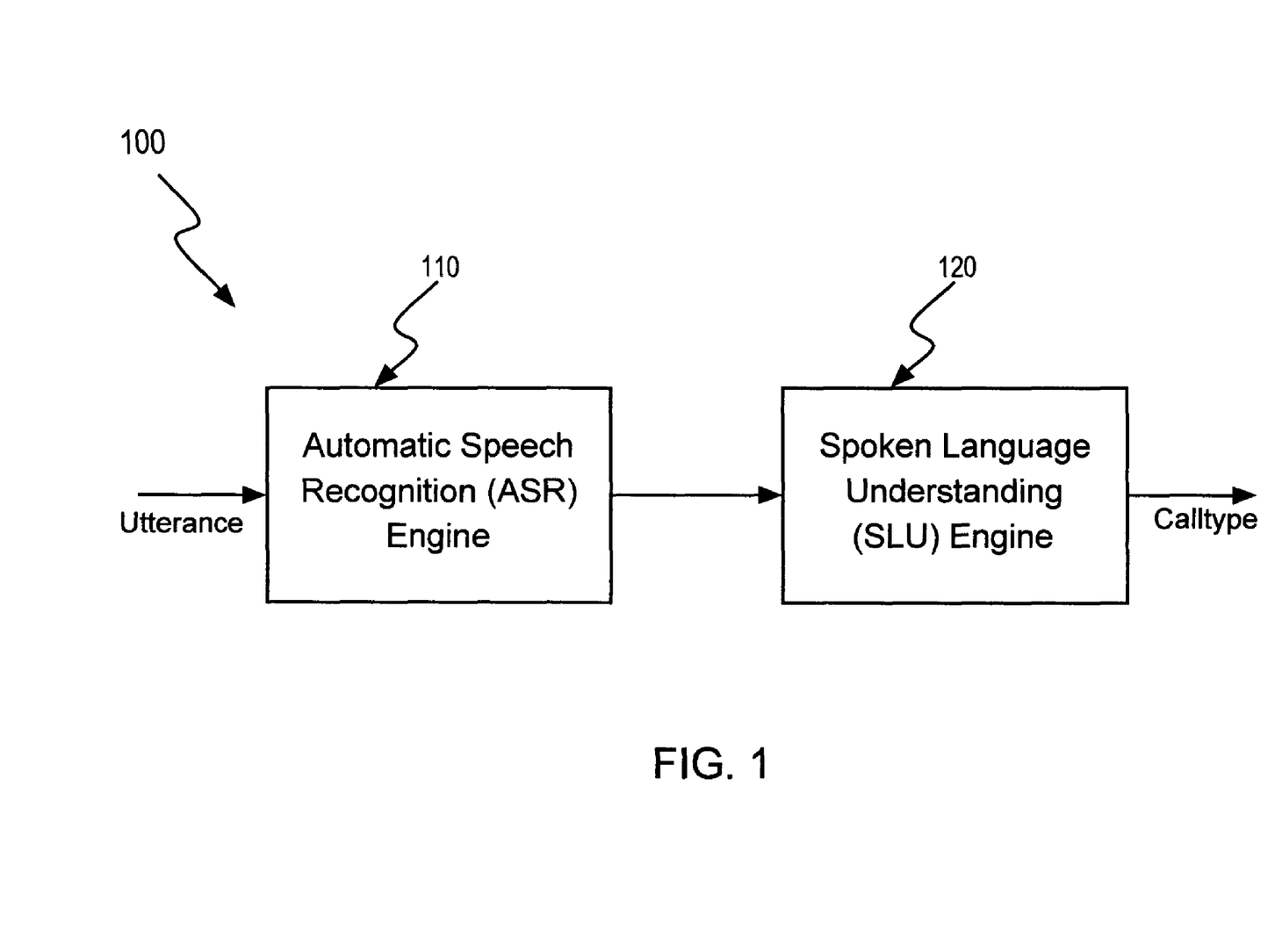
FIG. 1 illustrates a general architecture of a natural language spoken dialog system.

A general architecture of a natural language spoken dialog system is illustrated in FIG. 1. As illustrated, natural language spoken dialog system 100 includes a large vocabulary automatic speech recognition (ASR) engine 110 that relies on one or more knowledge sources (e.g., acoustic and language models) to extract words from user speech. Natural language spoken dialog system 100 also includes a spoken language understanding (SLU) engine 120 that is operative to extract meaning from the output of ASR engine 110 and classify customer requests. For example, SLU engine 120 can be designed to classify input telephone calls into various calltypes (or classes), such as Billing Credit, Calling Plans, etc. An embodiment of a natural language spoken dialog system 100 is exemplified by AT&T's How May I Help You (HMIHY) natural language spoken dialog system.

ASR engine 110 can be designed to generate a hypothesis based on a multiple-pass search strategy. For example, in an initial pass, the most discriminating and computationally affordable knowledge sources can be used to quickly reduce the number of hypotheses. This initial pass can be thought of as a fast match that eliminates the unlikely hypotheses. In a subsequent pass, a reduced set of hypotheses is examined, and more powerful and expensive knowledge sources can be used to further reduce the set of hypotheses.

In a 1-best ASR system, a single hypothesis is generated by ASR engine 110 and provided as input to SLU engine 120. In other examples, the n-best hypotheses are generated as output.

In one embodiment, ASR engine 110 can be designed to produce an n-best list. This n-best list includes the n hypotheses as text. In an alternative embodiment, ASR engine 110 can be designed to produce a word lattice, which is a directed graph of words, which can encode a large number of possible utterances.

Word lattices are used by many large vocabulary recognizers as a compact intermediate representation of alternative hypotheses and can contain orders of magnitude more hypotheses as compared to typical n-best lists. Word lattices provide significant advantages over n-best lists in that they can provide a more accurate representation of the hypothesis space.

It is recognized that using lattices as input to SLU engine 120 has the potential to be very promising for many reasons. First, the oracle accuracy of lattices is typically much higher. Here, the oracle accuracy is the accuracy of the path in a lattice closest to the transcriptions. As illustrated by the example noted above, it is likely that a word lattice would have the correct word "bill," instead of the sole 1-best system output "I have a question about my will." Second, word lattices include multiple hypotheses of the recognized utterance and thus can be useful in tolerating some amount of orthographic variability.

In accordance with the present invention, features of word lattices are exploited in a natural language spoken dialog system without relying on the provision of an entire word lattice to SLU engine 120. Rather, a transformed lattice, representing a computationally efficient form of the entire word lattice, is provided to SLU engine 120.

In one embodiment of the present invention, a word confusion network (in this case a sausage) is provided to SLU engine 120. A word confusion network is a special kind of lattice and includes a concatenation of word sets, one for each word time interval. Sausages are described in greater detail in L. Mangu, E. Brill, and A. Stolcke, "Finding Consensus in Speech Recognition: Word Error Minimization and Other Applications of Confusion Networks," *Computer Speech and Language*, vol. 14, no. 4, pp. 373-400, 2000, which is incorporated herein by reference in its entirety.

Figure 2:
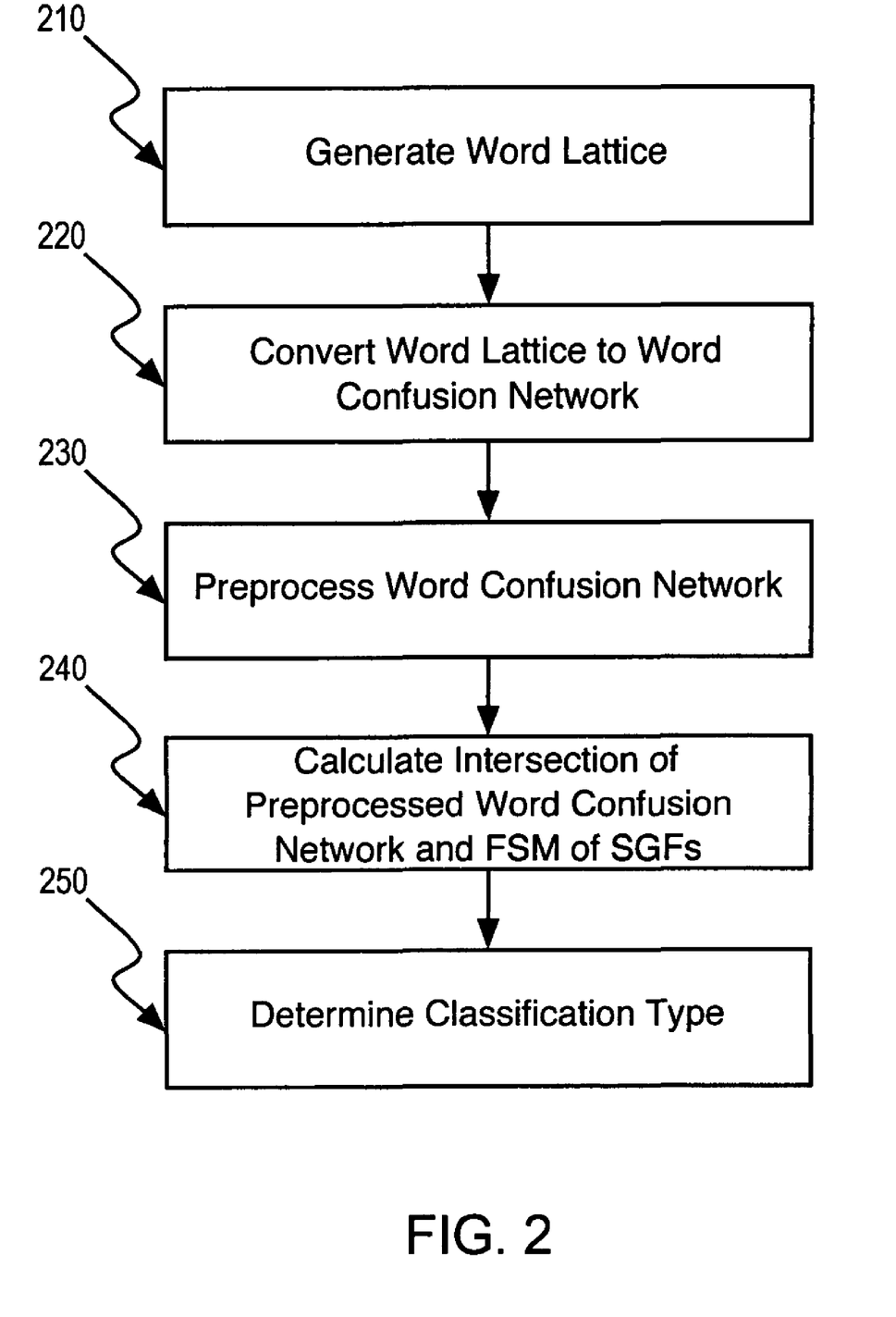
FIG. 2 illustrates a flowchart of processing in a natural language spoken dialog system in accordance with the present invention.

To illustrate the process of incorporating a transformed lattice into a natural language spoken dialog system, reference is made throughout the following discussion to the flowchart of FIG. 2. As illustrated, the spoken language understanding process begins at step 210 where a word lattice is generated, then transformed, at step 220, into a modified lattice structure (e.g., a word confusion network).

Figure 3A:
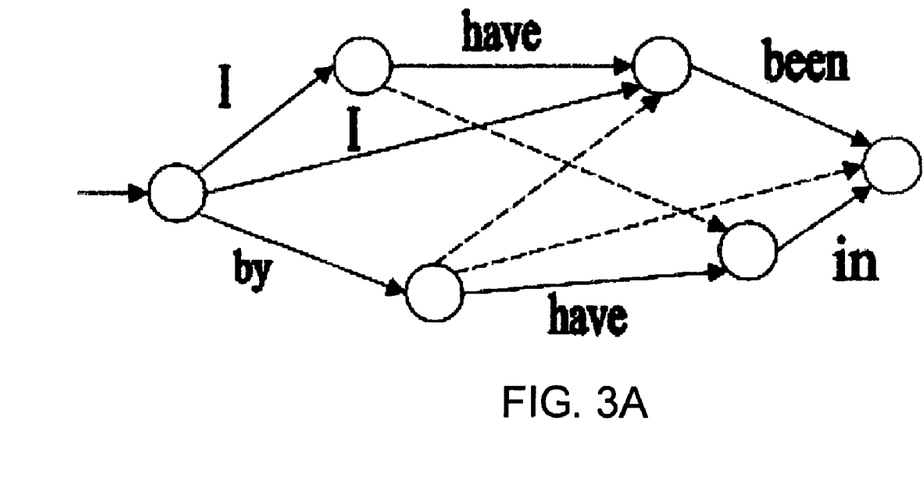
FIGS. 3A and 3B illustrate an exemplary structure of a lattice and its corresponding word confusion network.
Figure 3B:
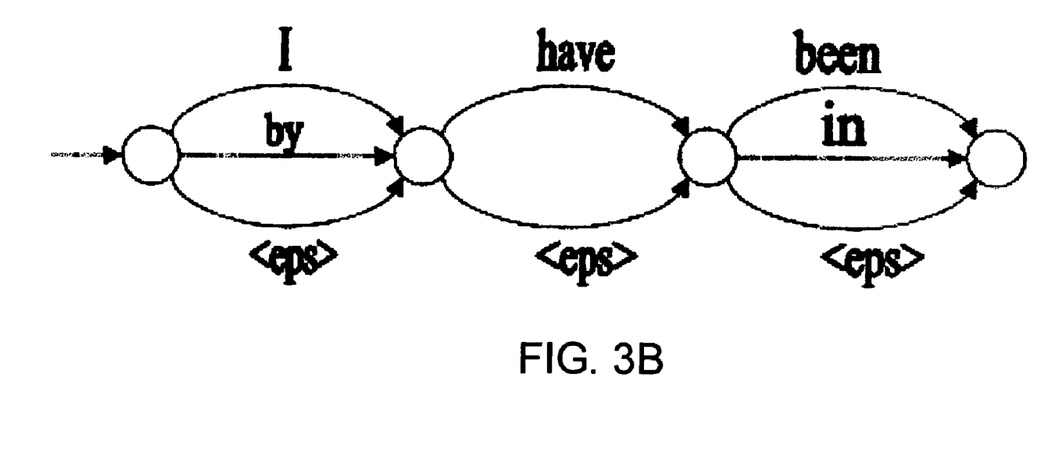

An exemplary structure of a word lattice and its corresponding word confusion network is illustrated in FIGS. 3A and 3B. Here, the "eps" in the word confusion network of FIG. 3B is used to represent an epsilon transition, which is a transition without any input (e.g., an empty word).

Word confusion networks can provide many advantages as compared to conventional word lattices. First, since word confusion networks force the competing words to be in the same group, they enforce the alignment of the words. This time alignment can be very useful in language processing.

Second, the words in the word confusion network come up with their posterior probabilities, which can be used as their confidence scores. This confidence score is basically the sum of the probabilities of all paths that contain that word. These confidence scores can be used by SLU engine 120.

Third, the memory sizes of the word confusion networks are about $1/100$ of those of typical word lattices. Notwithstanding the large disparity in memory size, experiments have shown that word confusion networks still have comparable oracle accuracy and even lower word error rate using the consensus hypothesis, which is the best path of the word confusion network.

It is a feature of the present invention that a modified lattice structure obtained from a word lattice is used in a natural language spoken dialog system. In one embodiment, the modified lattice structure is represented by a word confusion network. In the description provided below, the modified lattice structure is referred to by example as a word confusion network.

Prior to describing the processing of a word confusion network in a natural language spoken dialog system, a brief description of SLU engine 120 is first provided. In general, SLU engine 120 can include a series of modules, such as a preprocessor module, a matching module, a classifier module, etc.

In one embodiment, classification within SLU engine 120 depends on portions of input utterances, namely salient phrases, which are particularly relevant to some classification types (e.g., calltypes). For example, in an input utterance like "I would like to change oh about long distance service to one charge nine cents a minute," the salient phrase "cents a minute" is strongly related to the calltype Calling Plans.

Figure 4:
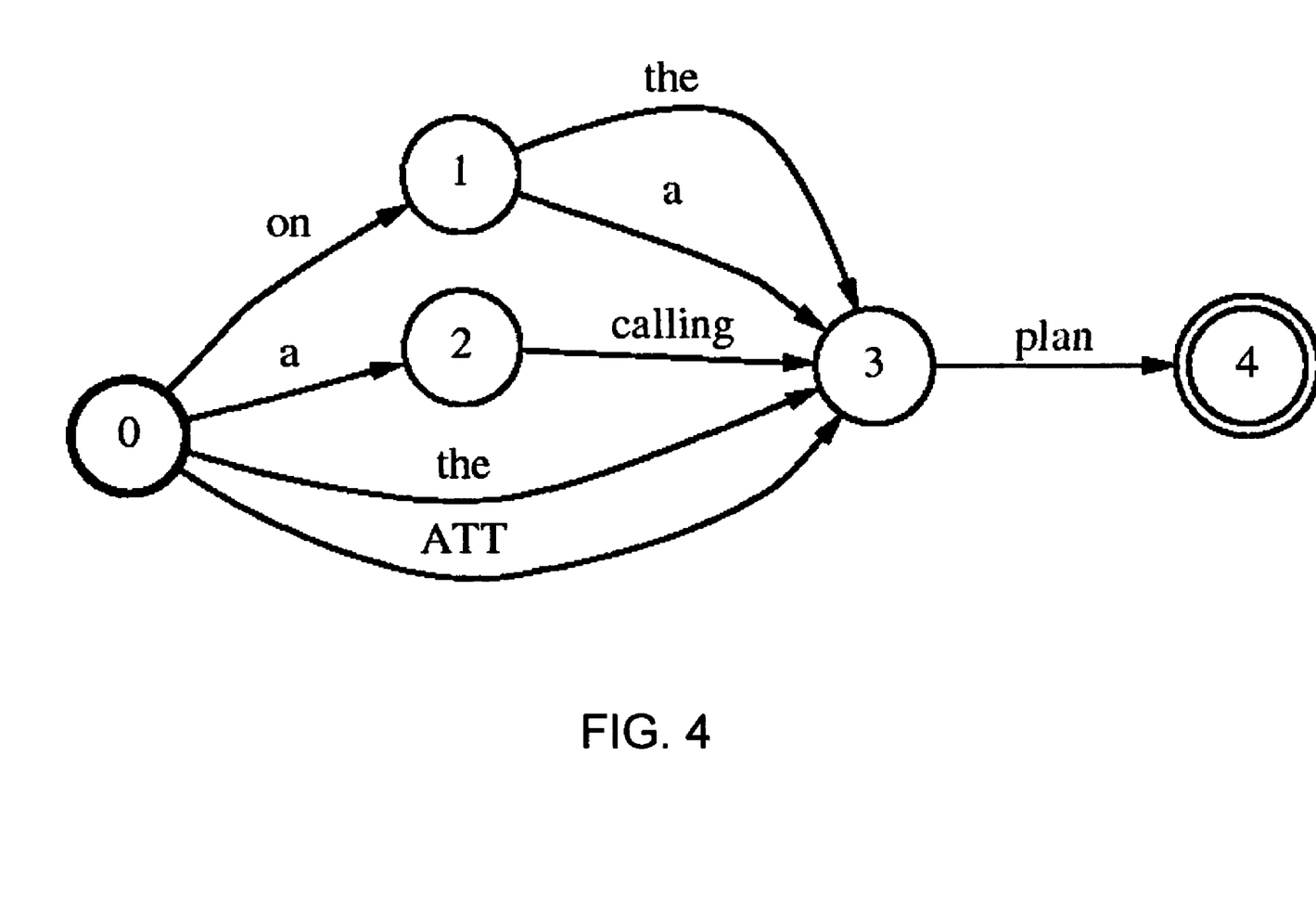
FIG. 4 illustrates an example of a salient grammar fragment.

Salient phrases can be automatically acquired from a corpus of transcribed and labeled training data and clustered into salient grammar fragments (SGFs) in the format of finite state machines (FSMs). This process is described in greater detail in J. Wright, A. Gorin, and G. Riccardi, "Automatic Acquisition of Salient Grammar Fragments for Call-Type Classification," in *Proceedings of the Eurospeech*, Rhodes, Greece, September 1997, pp. 1419-1422, and A. Gorin, G. Riccardi, and J. Wright, "How May I Help You?," *Speech Communication*, Vol. 23, pp. 113-127, 1997, both of which are incorporated herein by reference in their entireties. FIG. 4 illustrates an example of a SGF.

In applying SLU engine 120 to a word confusion network, the input word confusion network is first preprocessed. This preprocessing step, which is illustrated as step 230 in FIG. 2, can be based on finite state transducers (FSTs). In general, FSTs are operative to modify the word confusion network (e.g., replacing various forms of a word sequence attempting to identify AT&T with the token "ATT") for processing by SLU engine 120. As would be appreciated by one of ordinary skill in the relevant art, the specific form and types of preprocessing would be dependent upon the particular implementation of SLU engine 120. Examples of particular types of preprocessing functions are provided below.

After the preprocessing step, the preprocessed word confusion network is then provided to the matching module. In one embodiment, the matching module within SLU engine 120 is formed as a single FST of all of the SGFs in SLU engine 120. Here, this single FST can represent a union of the FSTs of the SGFs that can be preceded or followed by any number of words.

Figure 5:
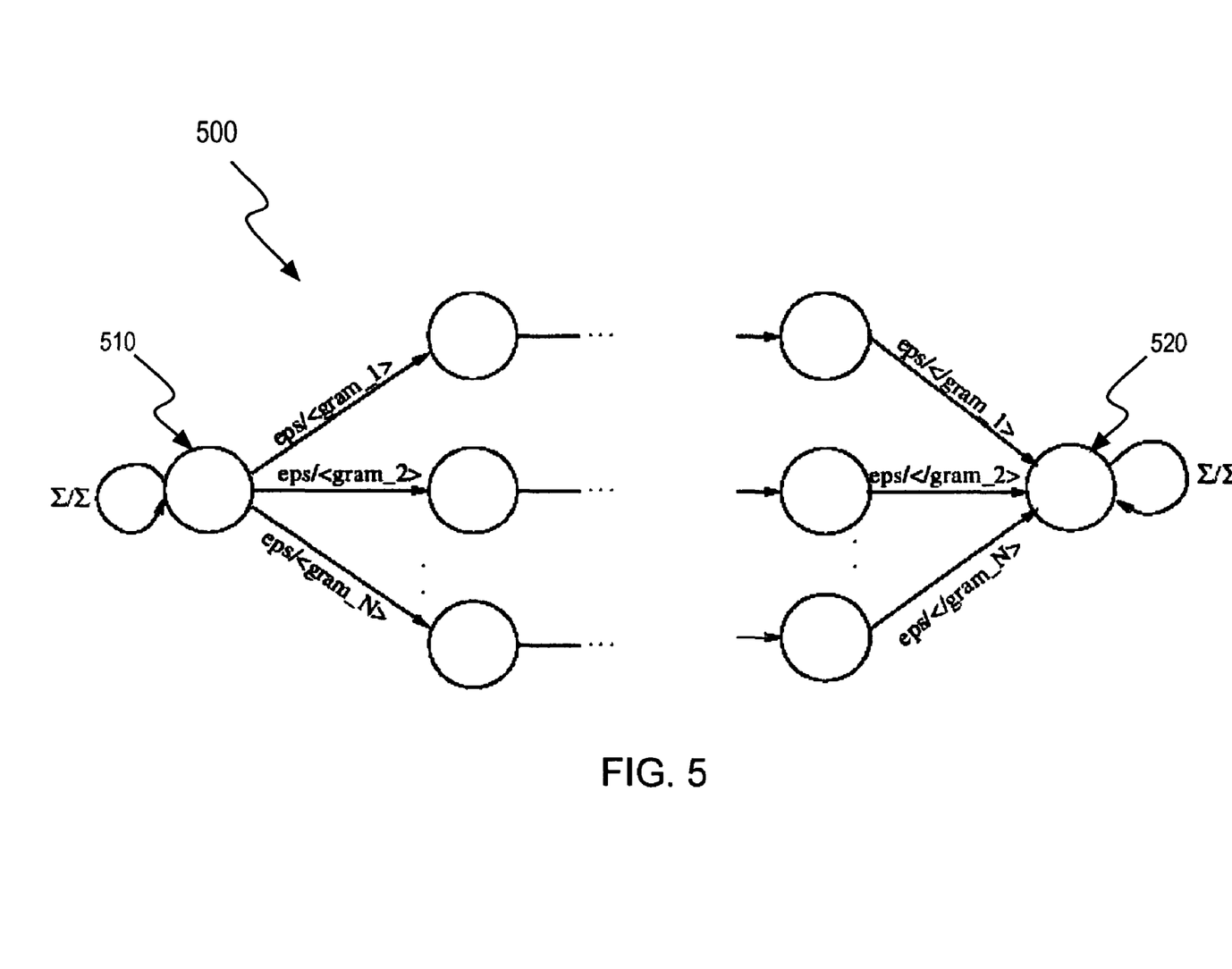
FIG. 5 illustrates an example of a finite state transducer having a plurality of salient grammar fragments.

FIG. 5 illustrates an embodiment of a single FST of the SGFs. As illustrated, FST 500 includes state node 510, which represents a word position prior to a SGF, and state node 520, which represents a word position after a SGF. As further illustrated, boundaries of a salient phrase found are marked with <gram_n> and </gram_n> tokens, where "n" is the ID of the SGF, Σ denotes any word in the vocabulary, and "eps" denotes an epsilon transition (or empty word). In practical applications, FST 500 can potentially include SGFs for over a thousand salient phrases.

Once a single FST is available, the matching module of SLU engine 120 can then proceed to identify the salient phrases that are included in the word confusion network that is provided to SLU engine 120.

Identification of the salient phrases in the word confusion network can be based on the calculation of the intersection between the preprocessed word confusion network and the single FST, which includes FSMs of a plurality of SGFs. This calculation, which occurs at step 240 of FIG. 2, enables the enumeration of the paths (where each path contains exactly one salient phrase) in the resulting FST. For example, one path can be as follows:

"I am<gram_11>on the plan</gram_11>of . . . "

After the SGFs are matched in the preprocessed word confusion network, the results can then be processed to determine the particular classification types (e.g., calltypes) that are believed to apply to the input utterance. In this determination process, the results are filtered and parsed for the classifier.

Given the sets of SGFs, the classifier assigns some raw scores to the calltypes. In order to adjust these individual scores, p, so that the probability of being correct can be determined, the following logistic regression formula can be used using the length, l, and coverage (the percentage of the words occurring inside a salient phrase in an utterance), c, of that utterance:

$$p' = \frac{1}{1 + e^{-(\beta_0 + \beta_1 \times p + \beta_2 \times l + \beta_3 \times c)}}$$

Here, the β values are learned from the training data, using the Newton-Raphson method. The Newton-Raphson method is described in greater detail in A. Agresti, *Categorical Data Analysis*, chapter 4, pp. 84-117, John Wiley and Sons, 1990, which is incorporated herein by reference in is entirety.

Figure 6:
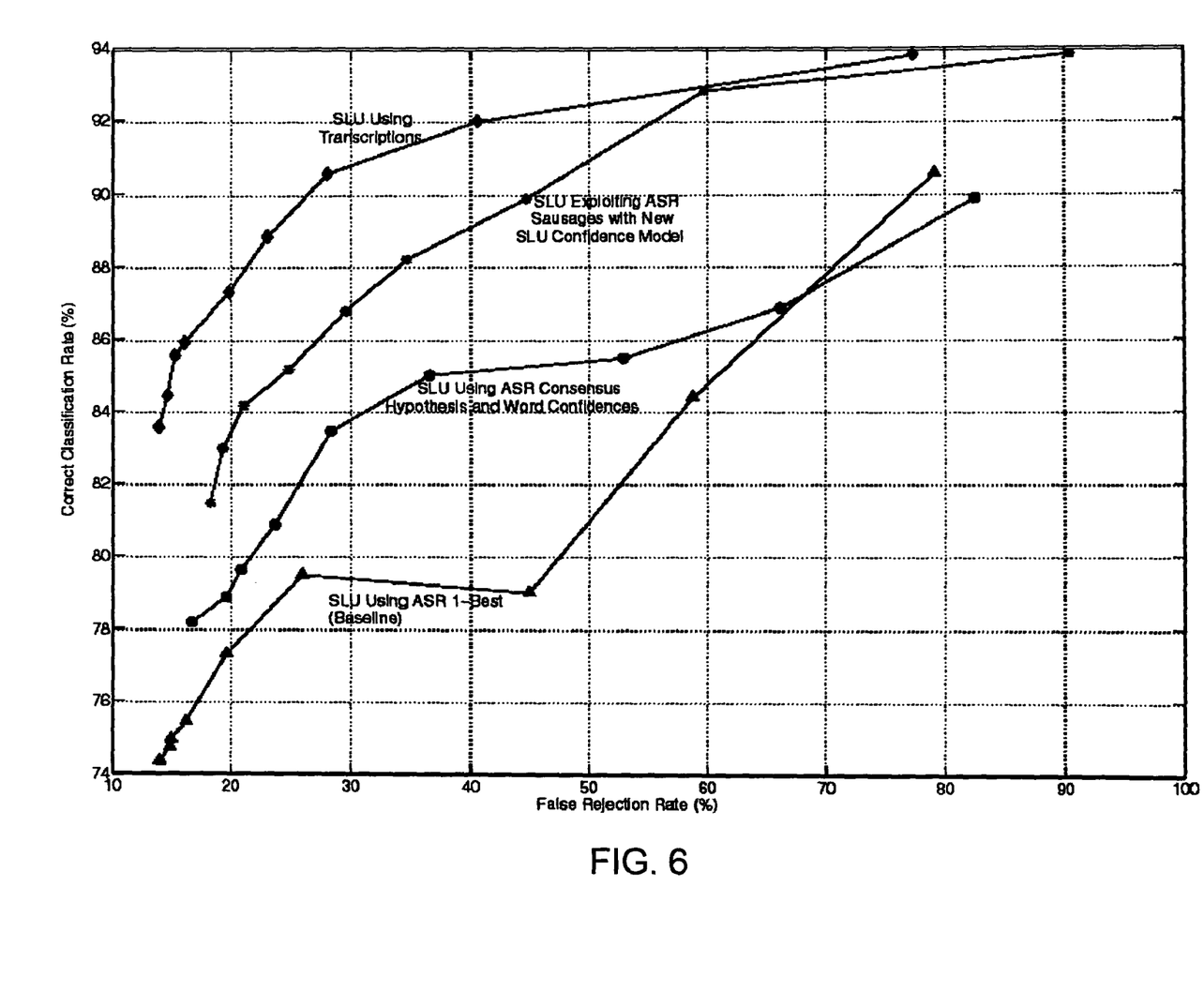
FIG. 6 illustrates a graph that indicates improvements in call classification performance.

FIG. 6 illustrates the results of experiments that were conducted to evaluate the change in performance due to the principles of the present invention. In these experiments, the ASR engine 110, the set of SGFs, and the SLU classifier were kept unchanged. Mangu's algorithm was used to convert lattices into word confusion networks.

The results of FIG. 6 are presented in the form of a receiver operating characteristic (ROC) curve, in which the threshold is varied to see the effects of false rejection and correct classification. The utterances for which the calltype score is below that threshold are rejected (labeled as "Other"); otherwise, accepted (thus classified). The correct classification rate is the ratio of corrects among the accepted utterances. The ratio of the utterances that should be classified but are rejected is called the false rejection rate. Hence, there is a trade-off between correct classification and false rejection by varying the rejection threshold, and the ultimate aim is to reach a correct classification rate of 100%, and false rejection rate of 0%.

The baseline performance uses the ASR 1-best output. The other results shown are the results using word confidence scores obtained from the consensus hypothesis, the results using the whole word confusion network along with a new SLU confidence model, and finally the results using transcriptions. Note that the curve for the transcriptions uses the new SLU confidence model.

1405 utterances from 1208 dialogs are used as the test data. All the utterances are responses to the first greeting in the dialog (e.g. "Hello, This is AT&T How May I Help You?"). The word error rate for these utterances is 31.7% and the oracle accuracy of the lattices is 91.7%. Here, the oracle accuracy of a lattice is defined as the accuracy of the path in the lattice closest to the transcription. This number decreases only to 90.6% using word confusion networks, but note that the average size of a word confusion network is 100 times less than a lattice. Furthermore, the word error rate of the consensus hypothesis is 0.6% smaller at 31.1%.

As seen, first using salient phrase confidence scores, even using the consensus hypothesis of the word confusion network, the error rate decreases 18% on the ROC curve for a false rejection rate of 30%. This shows the importance of the confidence score of a salient phrase for the classifier. Then using the whole word confusion network along with the new SLU confidence model, we manage to increase this improvement to 38% for the same false rejection rate. The ROC curve using transcriptions verifies that we are now closer to the upper bound of the classifier.

Having described a general framework for incorporating word confusion networks into a natural language spoken dialog system, example elements of a particular implementation of a preprocessor are now provided. These implementation details serve to exemplify some considerations that are relevant to the use of word confusion networks in a particular SLU engine.

If the composition within SLU engine 120 is done naively, the number of resulting salient phrases would be huge (in the order of millions). While enumerating the phrases in the result, it produces one distinct match for each of the paths containing that phrase. This includes all the combinations of the words in the nodes of the word confusion network that are outside of the match. For example, the following two matches are considered to be different, although the difference is beyond the boundaries of the salient phrase:

"I am<gram_11>on the plan</gram_11>of . . . "

"I am<gram_11>on the plan</gram_11>on . . . "

Figure 7:
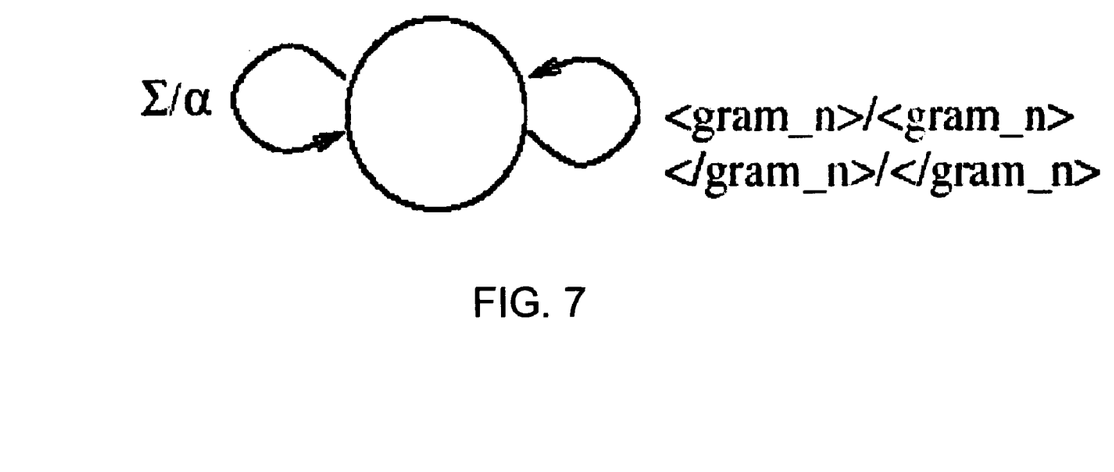
FIG. 7 illustrates a finite state transducer for mapping all words to a token.

Noting that, we are only interested in the ID and boundaries of the salient phrases, this problem can be avoided by simply mapping all the words in the result to a single token, α. This is done easily by composing the FST of the SGFs with the FST shown in FIG. 7. As illustrated in the FST of FIG. 7, all words, Σ, are mapped to α, and <gram_n> and </gram_n> tokens are used for marking the boundaries of a SGF.

Assuming that there is almost always an epsilon transition between two consecutive nodes of a word confusion network, the result contains a distinct path for each salient phrase with different numbers of epsilons used before or after that match. For example, the following two matches are considered to be different, although the only difference is that the second word is eps, in other words, deleted.

"αα<gram_11>ααα</gram_11>α . . . "

"α<gram_11>ααα</gram_11>α . . . "

This problem can be solved by changing all the epsilons in the word confusion network to another token, λ, and then behaving λ as an epsilon. In order to do this, a λ/λ transition is placed at every state of the FST of the SGFs, and a λ* expression is inserted between two tokens in the regular expressions (to allow any number of λs in-between) while forming the preprocessor. For example, the rule forming the token "ATT" has become as follows:

$$A\lambda^*(A|T|\text{and}|\lambda)+\lambda^*T \rightarrow ATT$$

Because of the epsilons (or now λs) appearing as the very first or very last tokens of a salient phrase, it is possible to have the same salient phrase occurring with different numbers of λs at these positions, as shown below:

"αλ<gram_11>ααα</gram_11>α..."

"α<gram_11>λααα</gram_11>α..."

Figure 8:
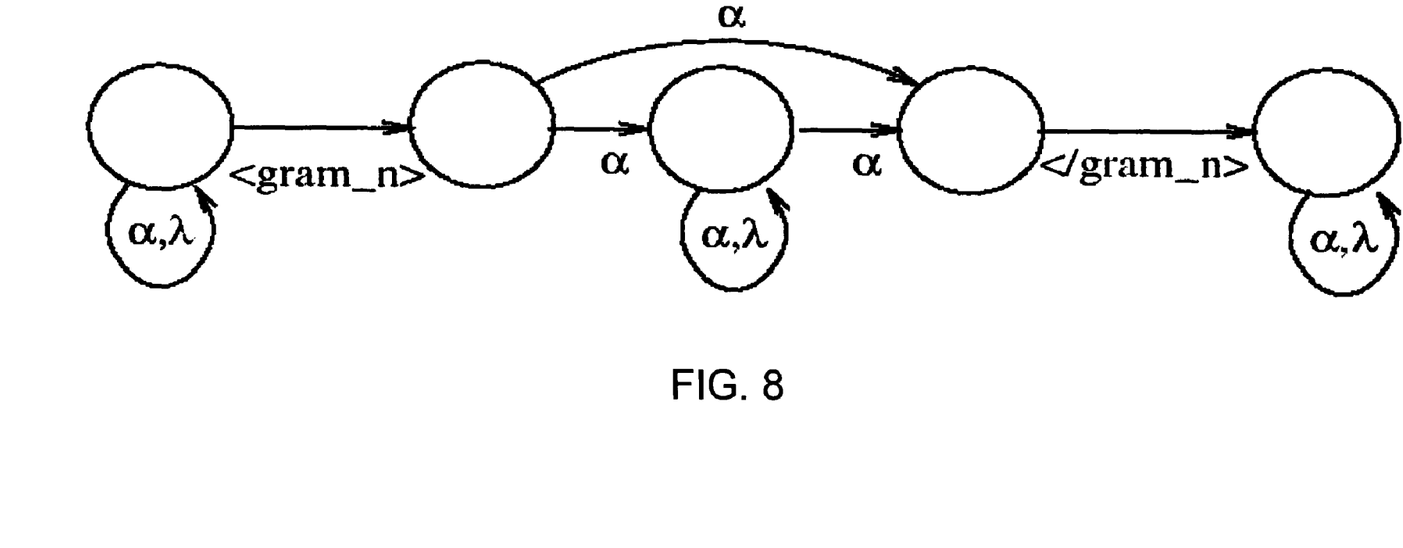
FIG. 8 illustrates a finite state transducer for avoiding epsilons as the first or last token in a salient phrase.

In order to avoid this, we form an FST as shown in FIG. 8 and compose the FST of the SGFs with this. Note that only α is allowed as the first and last token of a salient phrase. We use the FST after all these compositions as our new FST of the SGFs.

As thus described, algorithms have been presented for exploiting the word confusion networks obtained from ASR word lattices as input to a speech understanding system, and their utility demonstrated for a natural language spoken dialog system. Exploiting the fact that word confusion networks are nothing but finite state machines, the preprocessor and SGFs have been converted into FSTs and have reduced this task to consecutive compositions of FSMs. Doing so, when compared with the performance of the baseline, 38% reduction in error rate is achieved, keeping the ASR and the SLU classifier otherwise unchanged.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media. Furthermore, where a "tangible" computer readable media is claimed, this narrower type of media expressly excludes a wireless communication connection, or a signal per se. In this respect, the tangible computer readable media is limited to include hardware components such as RAM, ROM, EEPROM, CD-ROM, optical storage, magnetic disk storage, and the like.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the preferred embodiments of the invention may be described with reference to ASR and SLU components within a spoken dialog system. However, the invention may have applicability in a variety of environments where ASR and SLU may be used. Therefore, the invention is not limited to ASR and SLU within any particular application. Accordingly, the appended claims and their legal equivalents only should define the invention, rather than any specific examples given.

What is claimed is:

1. A computer-implemented method, comprising:
converting in a processor a word lattice that describes multiple hypotheses of a received input utterance at an automatic speech recognition (ASR) engine into a modified word lattice, wherein transitions without any input in the word lattice are represented as epsilon transitions in the modified word lattice; and
performing in a processor spoken language understanding for the received input utterance based on the modified word lattice.

2. The computer-implemented method of claim 1, wherein the converting further comprises aligning words in the word lattice.

3. The computer-implemented method of claim 2, wherein the converting further comprises converting the word lattice into a word confusion network.

4. The computer-implemented method of claim 1, wherein the converting is performed at an ASR engine associated with said processor and performing spoken language understanding occurs at a spoken language understanding engine associated with said processor.

5. The computer-implemented method of claim 1, wherein the performing further comprises:
calculating an intersection of the modified word lattice and a finite state machine including a plurality of salient grammar fragments; and
determining a classification type for the input utterance based on the calculated intersection.

6. The computer-implemented method of claim 5, further comprising preprocessing in said processor the modified word lattice, wherein the calculating comprises calculating an intersection of the preprocessed modified word lattice and the finite state machine.

7. The computer-implemented method of claim 5, wherein the calculating comprises calculating the intersection of the modified word lattice and a finite state machine that consists of all of the salient grammar fragments.

8. The computer-implemented method of claim 5, wherein the calculating comprises calculating an intersection of the modified word lattice and the finite state machine including the plurality of salient grammar fragments to produce a set of salient phrases.

9. The computer-implemented method of claim 8, further comprising filtering and parsing in said processor the set of salient phrases.

10. A module in an automatic speech recognition (ASR) engine that is configured to control a processor to:
  determine an intersection of a word lattice that converts a word lattice that describes multiple hypotheses of a received input utterance into a modified word lattice, wherein transitions without any input in the word lattice are represented as epsilon transitions in the modified word lattice; and
  a module configured to perform spoken language understanding for the received input utterance based on the modified word lattice.

11. The speech processing system using the module of claim 10, wherein the module configured to convert further aligns words in the word lattice.

12. The speech processing system using the module of claim 11, wherein the module configured to convert further converts the word lattice into a word confusion network.

13. The speech processing system using the module of claim 12, wherein posterior probabilities of the word confusion network are used as confidence scores.

14. The speech processing system using the module of claim 10, wherein the module configured to convert conform further calculates an intersection of the modified word lattice and a finite state machine including a plurality of salient grammar fragments and determines a classification type for the input utterance based on the calculated intersection.

15. The speech processing system using the module of claim 14, further comprising a module configured to preprocess the modified word lattice, wherein the module configured to calculate further calculates an intersection of the preprocessed modified word lattice and the finite state machine.

16. The speech processing system using the module of claim 14, wherein the module configured to calculate further calculates the intersection of the modified word lattice and a finite state machine that consists of all of the salient grammar fragments.

17. The speech processing system using the module of claim 14, wherein the module configured to calculate further calculates an intersection of the modified word lattice and the finite state machine including the plurality of salient grammar fragments to produce a set of salient phrases.

18. The speech processing system using the module of claim 17, further comprising a module configured to filter and parse the set of salient phrases.

19. The tangible computer-readable medium that stores a program for controlling a computing device to perform a speech processing method, the method comprising:
  converting a word lattice that describes multiple hypotheses of a received input utterance at an automatic speech recognition (ASR) engine into a modified word lattice, wherein transitions without any input in the word lattice are represented as epsilon transitions in the modified word lattice; and
  performing spoken language understanding for the received input utterance based on the modified word lattice.

20. The tangible computer-readable medium of claim 19, wherein the performing spoken language understanding further comprises:
  calculating an intersection of the modified word lattice and a finite state machine including a plurality of salient grammar fragments; and
  determining a classification type for the input utterance based on the calculated intersection.

21. The tangible computer-readable medium of claim 19, wherein the converting further comprises converting the word lattice into a word confusion network wherein posterior probabilities are used as confidence scores.

* * * * *